United States Patent
Hwang

[11] Patent Number: 5,310,298
[45] Date of Patent: May 10, 1994

[54] EXPANSION NUT FOR T-JOINT OF PIPES

[76] Inventor: Shoei-Muh Hwang, No. 3, Lane 71, Chang Shoei Road, Changhua City, Taiwan

[21] Appl. No.: 87,296

[22] Filed: Jul. 8, 1993

[51] Int. Cl.⁵ .................... F16B 19/00; F16B 37/04
[52] U.S. Cl. ................................. 411/182; 411/510; 411/913; 403/252
[58] Field of Search ............ 411/182, 508, 509, 510, 411/525, 526, 527, 528, 913; 403/252

[56] References Cited

U.S. PATENT DOCUMENTS

| | | | |
|---|---|---|---|
| 1,083,697 | 1/1914 | Neptune | 411/526 |
| 2,640,219 | 6/1953 | Becker | 411/528 |
| 4,518,293 | 5/1985 | Pleickhardt et al. | 411/182 X |
| 4,704,059 | 11/1987 | Nakama et al. | 411/510 X |
| 4,810,144 | 3/1989 | Martelli | 411/182 |

*Primary Examiner*—Neill R. Wilson
*Attorney, Agent, or Firm*—Beveridge, DeGrandi, Weilacher & Young

[57] ABSTRACT

Disclosed is a one-piece expansion nut for a T-joint of pipes, including an internal thread hole at the center thereof and a plurality of long expanding pieces and short expanding pieces alternatively disposed around the outer periphery thereof, wherein the outer diameters formed by the long and short expanding pieces the same, but slightly larger than the inner diameter of one pipe to be jointed, upon putting the expansion nut into the pipe and passing a bolt through another pipe to screw onto the internal thread hole for a T-joint, the long and short expanding pieces being respectively expanded to exert force against the inner wall of the one pipe in two stages, so as to firmly hold the expansion nut in place and effectively complete the T-joint as required. Further, each long expanding piece can, during the manufacturing processes, be further punched to form a catch tab at the inner side of the upper part thereof, making the outer diameter formed by the catch tabs slightly smaller than that formed by the long or short expanding pieces; the catch tabs being expanded as well to exert another force against the inner wall of the one pipe, so as to help complete the T-joint as required more effective.

5 Claims, 4 Drawing Sheets

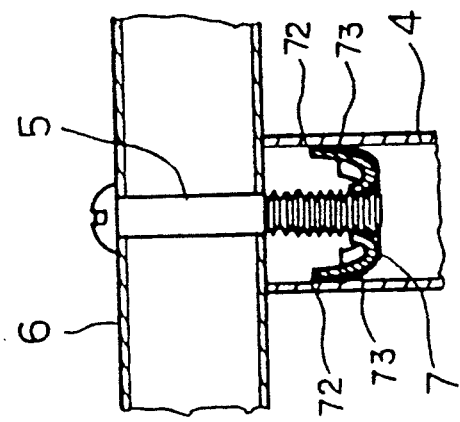
FIG. 4
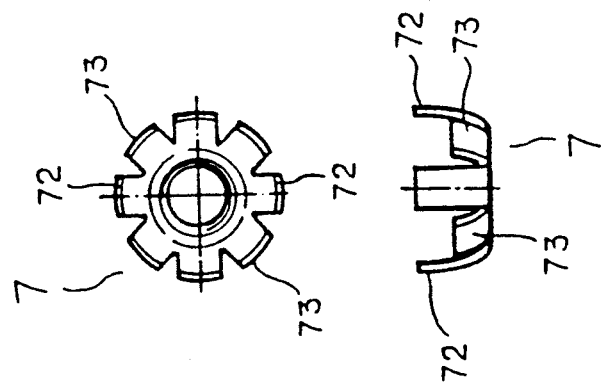
FIG. 3A
FIG. 3B

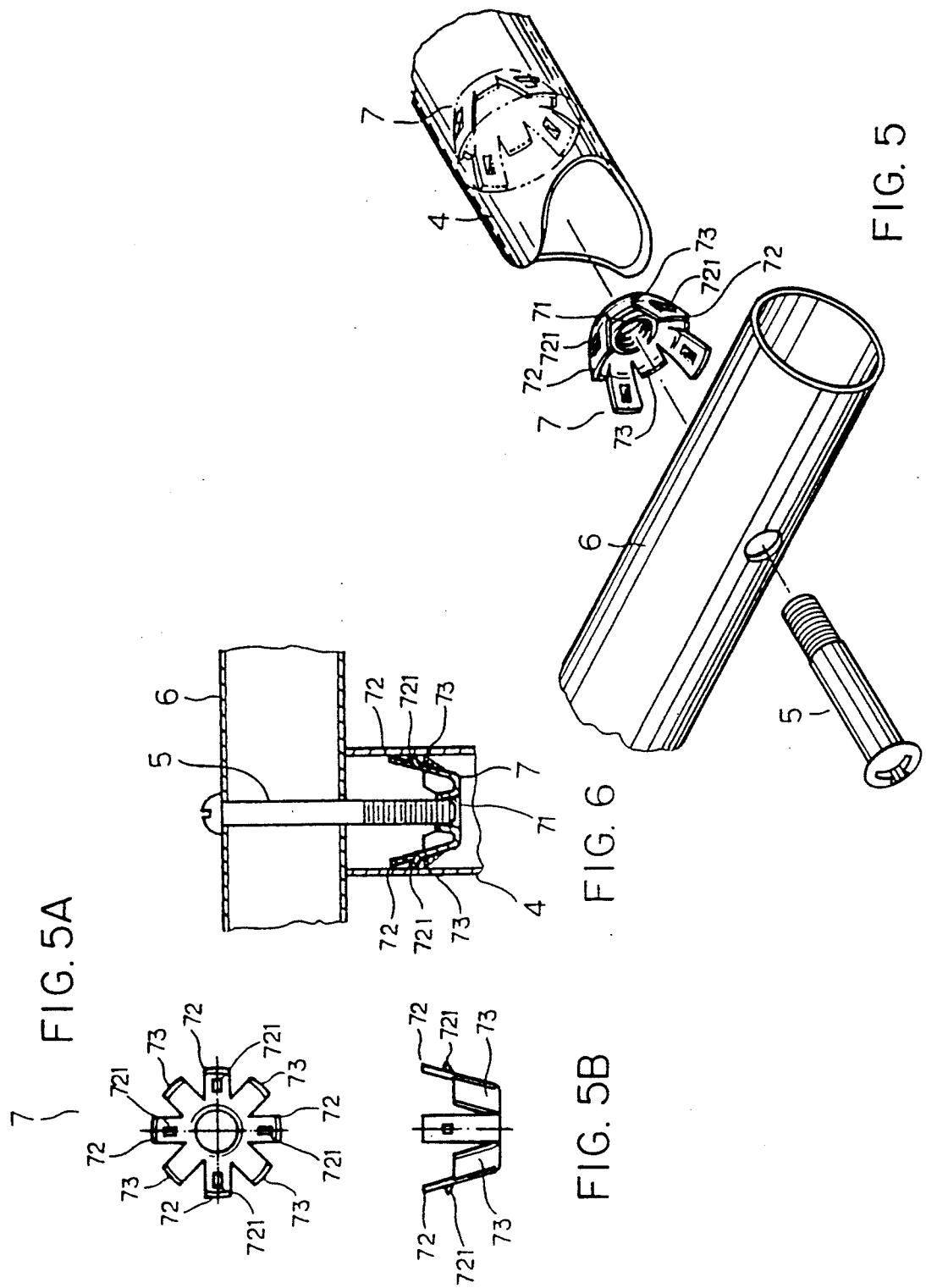

EXPANSION NUT FOR T-JOINT OF PIPES

BACKGROUND OF THE INVENTION

The present invention relates to an expansion nut, and more particularly to a one-piece expansion nut for the T-joint of pipes.

Referring to FIGS. 1A, 1B and 2, an expansion nut 2 according to the prior art is generally comprised of an internal thread 21 art the central hole thereof at either end thereof. The expanding pieces 3 are cut to form a plurality of tabs 31 extended radially and properly curved in the same direction, making their outer diameter slightly larger than the inner diameter 41 of one pipe 4. Both ends 22 of the nut 2 are made to allow the inner circle 32 of each expanding piece 3 to sit thereon, then these two ends 22 are hammered to make a tight fit between the inner circle 32 of each expanding piece 3 and the nut 2. When the nut 2 is put into the pipe 4 and a bolt 5 passes through another pipe 6 to screw onto the internal thread 21 of the nut 2, tabs 31 of the expanding pieces 3 can be expanded to complete a T-joint of the pipes.

For the expansion nut according to the prior art, however, the nut 2 and expanding pieces 3 must first be made separately, then have them assembled by many processing procedures. It is therefore complicated and inconvenient in its manufacture and assembly.

SUMMARY OF THE INVENTION

The present invention has been accomplished under the aforesaid circumstances. It is the main object of the present invention to provide a one-piece expansion nut for a T-joint of pipes, comprising an internal thread hole at the center thereof and a plurality of long expanding pieces and short expanding pieces alternatively disposed around the outer periphery thereof, wherein the outer diameters formed by those long and short expanding pieces are the same, but slightly larger than the inner diameter of one pipe to be jointed, upon putting the expansion nut into the pipe and passing a bolt through another pipe to screw onto the internal thread hole for a T-joint, those long and short expanding pieces being respectively expanded to exert force against the inner wall of the one pipe in two stages, so as to firmly hold the expansion nut in place and effectively complete the T-joint as required.

It is another object of the present invention to provide a one-piece expansion nut for T-joint of pipes, which is simple in structure, needs no other related parts for assembling, and can be manufactured rapidly at low cost, when compared with those according to the prior art.

It is still another object of the present invention to provide a one-piece expansion nut for a T-joint of pipes, wherein each long expanding piece can, during the manufacturing processes, be further punched to form a catch tab at the inner side of an upper part thereof, making the outer diameter formed by the catch tabs slightly smaller than that formed by the long or short expanding pieces. These catch tabs can be expanded as well to exert another force against the inner wall of the one pipe, so as to help complete the T-joint as required more effectively.

BRIEF DESCRIPTION OF THE DRAWINGS

FIGS. 3A and 3B are a top view and a sectional view respectively of an expansion nut according to the present invention;

FIG. 4 is the perspective sectional view showing how an expansion nut of the present invention is operated;

FIG. 5 is the exploded view showing another embodiment of the expansion nut according to the present invention;

FIGS. 5A and 5B are a top view and a sectional view respectively of a second embodiment according to the present invention; and FIG. 6 is the perspective sectional view showing how the second embodiment of the expansion nut according to the present invention is operated.

DETAILED DESCRIPTION OF THE PREFERRED EMBODIMENT

Figure 1A:
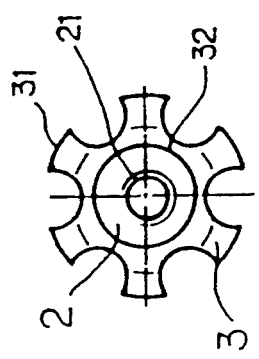
FIGS. 1A and 1B are a top view and a section view, respectively of an expansion nut according to the prior art.
Figure 1B:
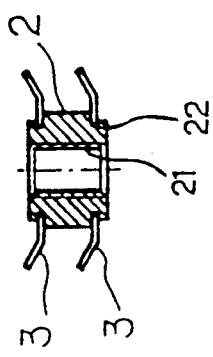
Figure 2:
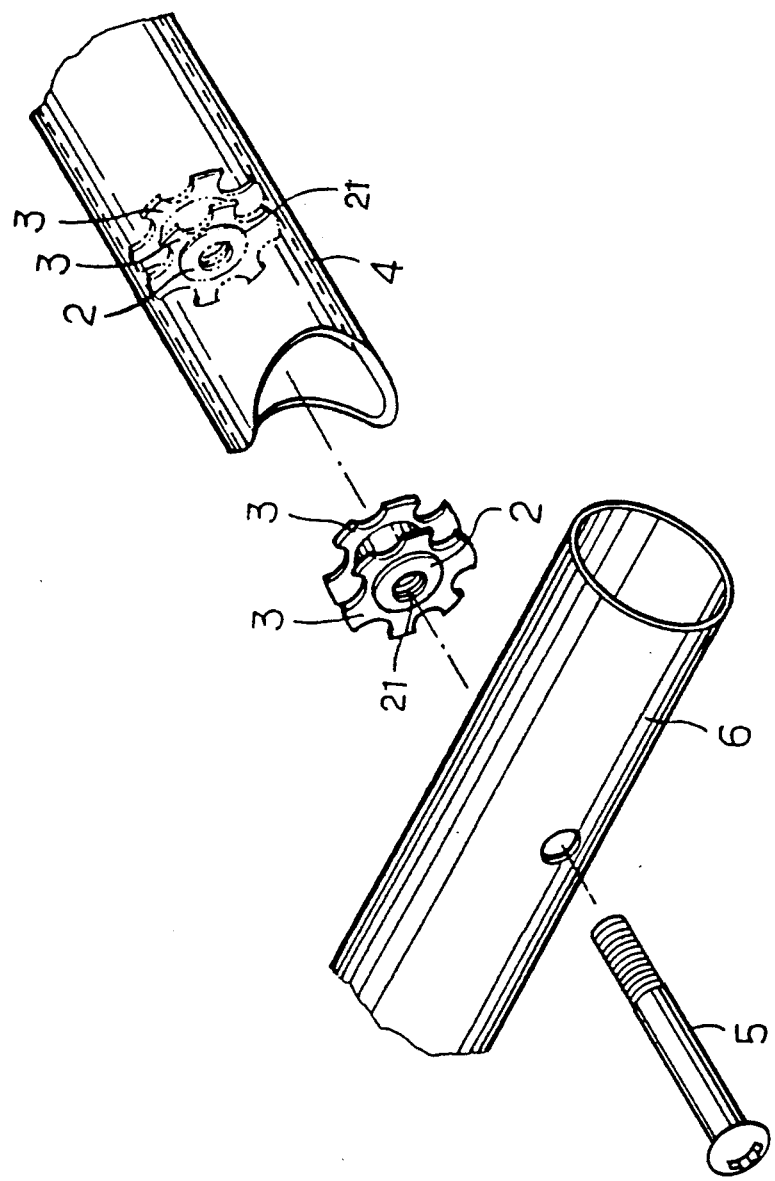
FIG. 2 is the exploded view showing an embodiment of the expansion nut according to the prior art.
Figure 3:
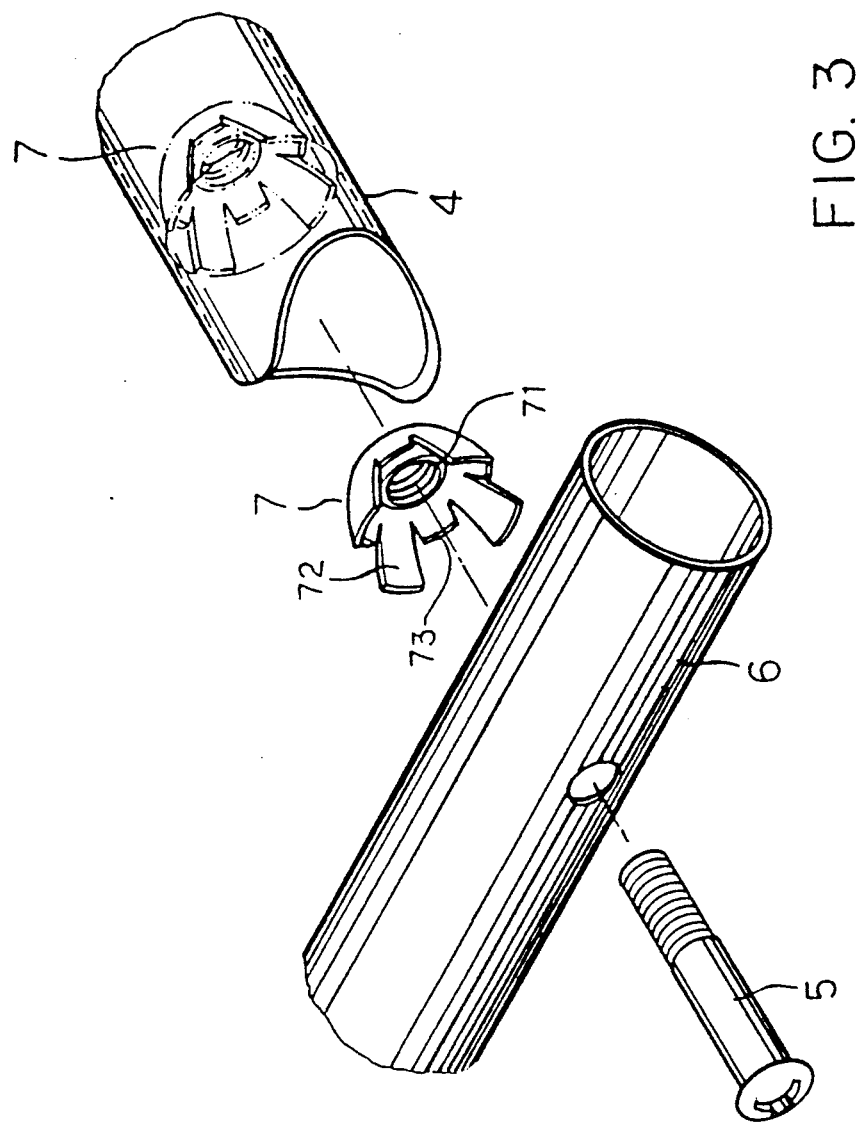
FIG. 3 is the exploded view showing an embodiment of the expansion nut according to the present invention.

Referring to FIGS. 3, 3A, 3B and 4, a one-piece expansion nut 7 for a T-joint of pipes according to the present invention is generally comprised of an internal thread hole 71 at the center of the nut body and a plurality of long expanding pieces 72 and short expanding piece 73 alternatively disposed around the outer periphery thereof.

The outer diameters formed by long and short expanding pieces 72, 73 respectively are the same, but slightly larger than the inner diameter of one pipe 4 to be jointed. Therefore, when the expansion nut 7 is put into the pipe 4 and a bolt 5 passes through another pipe 6 to screw onto the internal thread hole 71 at the center of the expansion nut 7 for a T-joint, those long and short expanding pieces 72, 73 can be respectively expanded to exert force against the inner wall of the pipe 4 in two stages, so as to firmly hold the expansion nut 7 in place and effectively complete the T-joint as required.

Referring to FIGS. 5, 5A, 5B and 6, during the manufacturing processes of the expansion nut 7 according to the present invention, each long expanding piece 72 can be further punched to form a catch tab 721 at the inner side of an upper part thereof, making the outer diameter formed by these catch tabs 721 slightly smaller than that formed by long or short expanding pieces 72 and 73. In such a way, when the expansion nut 7 is put into the pipe 4 and a bolt 5 passes through another pipe 6 to screw onto the internal thread hole 71 at the center of the body of the expansion nut 7 for a T-joint, those long and short expanding pieces 72, 73 can be respectively expanded to exert force against the inner wall of the pipe 4 in two stages, and further, the catch tabs 721 formed on the long expanding pieces 73 can be also expanded to exert another force against the inner wall of the pipe 4, so as to firmly hold the expansion nut 7 in place and more effectively complete the T-joint as required.

What is claimed is:

1. A one-piece expansion nut for a T-joint of pipes, comprising:

an expansion nut body defining an internal thread hole at a center thereof, the body including a plurality of long expanding pieces and short expanding pieces alternatively disposed around an outer periphery of the body wherein outer diameters formed by said long and short expanding pieces are the same, and the outer diameter is slightly larger than an inner diameter of a first pipe to be jointed, such that when said expansion nut is placed into the first pipe and a bolt is passed through a second pipe to screw into the internal thread hole for the T-joint, the long and short expanding pieces are respectively expanded to exert force against an inner wall of the first pipe in two stages, so as to firmly hold the expansion nut in place, wherein each long expanding piece includes a catch tab punched from an inner side of an upper part thereof, wherein an outer diameter formed by said catch tabs is slightly smaller than the outer diameters of said long or short expanding pieces; whereby when said long and short expanding pieces are respectively expanded to exert force against the inner wall of said first pipe, said catch tabs on said long expanding pieces are expanded to exert another force against the inner wall of said first pipe.

2. An expansion nut for forming a T-joint between two pipes, comprising:
an expansion nut body defining a threaded hole at a central portion;
a plurality of long expanding pieces extending from a periphery of the body;
a plurality of short expanding pieces extending from the periphery of the body, wherein outer diameters of the long and short expanding pieces are larger than an inner diameter of a first pipe in the T-joint;
a catch tab extending from a surface of the long expanding pieces such that when a bolt is threaded into the threaded hole in the nut body, the catch tabs exert force on an inner wall of the first pipe in the T-joint.

3. An expansion nut as defined in claim 2, wherein the outer diameter of the long expanding pieces is the same as the outer diameter of the short expanding pieces.

4. An expansion nut as defined in claim 2, wherein the catch tab extends away from the central portion of the nut body at an end part of the long expanding pieces.

5. An expansion nut as defined in claim 2, wherein the long expanding pieces and the short expanding pieces are alternatively disposed about the periphery of the body.

* * * * *